June 12, 1928.
F. A. HOWARD
1,673,678
ART OF PUMPING GASIFORM FLUIDS
Filed July 21, 1922
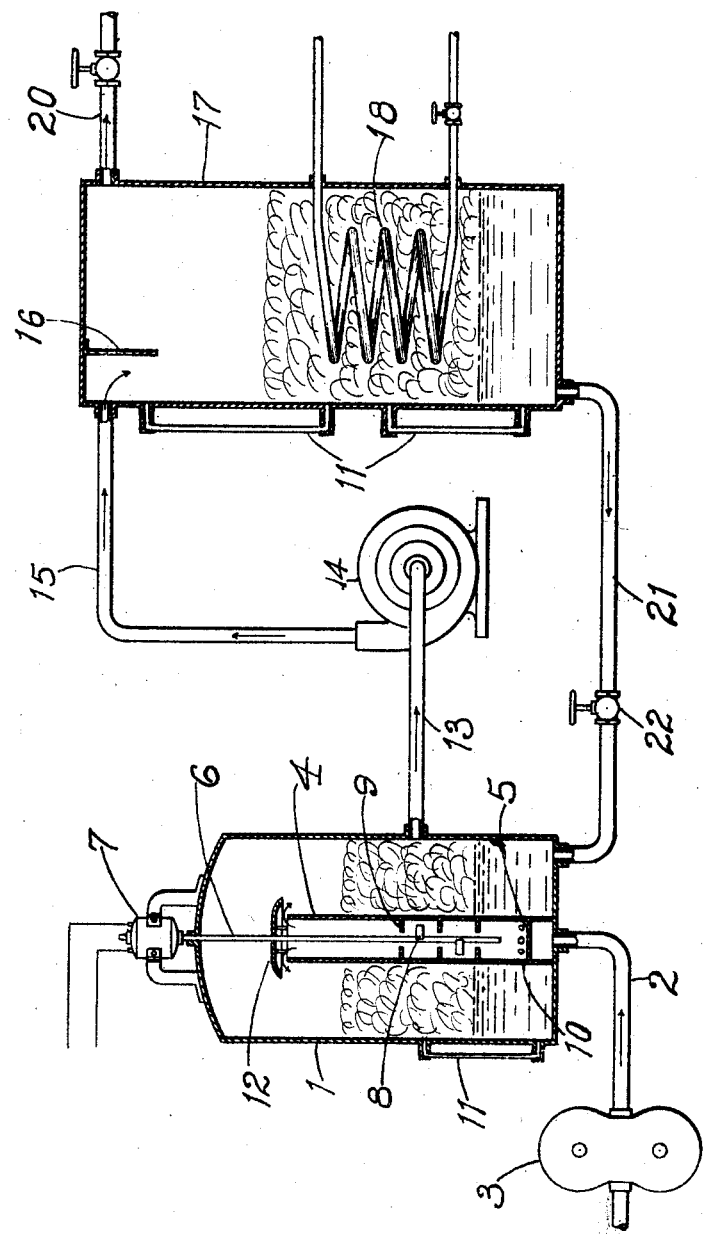
Inventor
Frank A. Howard
By Q. G. Messenger
Atty.

Patented June 12, 1928.

1,673,678

UNITED STATES PATENT OFFICE.

FRANK A. HOWARD, OF ELIZABETH, NEW JERSEY, ASSIGNOR TO STANDARD OIL DEVELOPMENT COMPANY, A CORPORATION OF DELAWARE.

ART OF PUMPING GASIFORM FLUIDS.

Application filed July 21, 1922. Serial No. 576,579.

The present invention relates to the art of pumping and compressing air or gasiform fluids and will be fully understood from the following description taken in connection with the accompanying drawing which represents in sectional elevation and somewhat diagrammatically for the sake of clearness one form of embodiment of the invention.

Notwithstanding the excellent mechanical work on the detail of prevalent constructions of air compressors, certain inherent limitations render their operation unduly high in cost and subject to interruption under heavy duty conditions. Tight joints with moving parts are difficult to maintain with such tenuous fluids as air and the like. Moreover the thermal cumulation factor is progressively more serious with larger units and to minimize detrimental effects, elaborate auxiliary provisions for cooling are required.

By the present invention I secure the end results of a gaseous system, in superior degree, and with the operating reliability and efficiency of the best liquid pumping systems. As an initial aid to the understanding of the invention, it may be stated in general outline that the air or gas is loaded into a carrier liquid, the liquid system is passed through a pumping element and the air or gas in them separated from the carrier liquid, available at the desired location and under the desired pressure.

Referring more particularly to the drawing, the reference character 1 designates a tank having an inlet pipe 2 for air forwarded by a suitable low pressure pump or blower 3, preferably a rotary blower. A beater chamber 4 receiving the air through a perforated diaphragm or screen 5 is provided with a beater shaft 6 rotated by suitable means, such as a motor 7, and carrying beater blades 8 which interdigitate with blades 9 fixed on the wall of the chamber. Openings 10 admit the carrier liquid from the tank chamber. Various liquids may be used, for example, an aqueous solution of aliphatic sulfonates, solutions of soaps, saponin licorice extract, carbohydrates and albuminous substances, also non-aqueous organic frothing liquids. The choice of the liquid will also depend upon the gas being pumped. The tank is equipped with a gauge glass 11; and a deflector 12 may be provided for directing the foam from the beater toward the pipe 13 which leads to a suitable pump 14, which may be of the reciprocating type, or of the multi-stage rotary or centrifugal type. From the pump a pipe 15 leads to discharge against a suitable baffle 16 in a tank 17. A heating coil 18 is provided for furnishing sufficient heat to weaken and break down the foam and release the air. The tank 17 is equipped with gauge glasses; and an off-take pipe 20 for the compressed air leads from the upper end, while a pipe 21 returns the de-aerated liquid to the beater tank.

In operation, the air supplied through the line 2 is beaten up into a foam of suitable body with the carrier liquid; the foamed liquid is then picked up by the pump 14 and is forwarded under the desired pressure to the breaker tank 17; here the foam is broken and the air is separated and is then available by the outlet line 20, while the de-aerated liquid is returned to the beater tank for reuse, the feed thereto being regulated by the valve 22. In some cases, it may be desirable to apply cooling means or jackets to the piping between the two tanks.

It will be noticed that since the air while being pumped on the pressure line is enveloped and dispersed in the liquid, virtually it is a liquid that is pumped, and correspondingly I am enabled to pump with the higher efficiency attainable in a liquid system and also compress as desired, and where using a multi-stage rotary or centrifugal pump I eliminate valve-mechanism troubles. Moreover as the air when being compressed is dispersed through liquid, the heat of compression is rapidly distributed and dissipated and the liquid itself furnishes a cooling system.

Although I have mentioned air more particularly, I contemplate within the purview of my invention the pumping of various gases and vapors for various duties; and it will be noticed that gases of a corrosive character can be especially well handled in this manner as action on the working parts is lessened by the enveloping inert carrier liquid. Also by connecting up the apparatus in return circuit it may be used as a circulating pump; or as a compression pump for certain refrigerating systems.

While in describing my invention, I have referred to various specific details, it will be understood that this is explanatory and illustrative and not limitative. Nor is the invention to be considered as dependent upon the accuracy of any theories or reasons mentioned in explanation of the advantageous results attained. On the contrary the invention is to be understood as limited only as defined in the following claims in which it is my intention to claim all inherent novelty as broadly as the prior art permits.

What I claim is:

1. Apparatus for compressing air, which comprises a beater, a tank for supplying liquid to the lower portion of the beater and for receiving foam overflowing from the top thereof, means for supplying air to the bottom of the beater, a multi-stage centrifugal pump for forwarding foam from said tank, a second tank into which the pump discharges, a pipe coil in said second tank for supplying heat and a connection from the said second tank to the first mentioned tank for returning liquid.

2. Apparatus for pumping gasiform fluids which comprises a beater, means for supplying a gasiform fluid to the beater, means for supplying liquid to said beater, a pump for compressing the foam produced by said beater, a tank into which the pump discharges, and a pipe for returning liquid to the beater.

3. Apparatus for pumping gasiform fluids, which comprises a beater, means for supplying a gasiform fluid to the beater, means for supplying liquid to said beater, a pump for compressing the foam produced by said beater, a tank into which the pump discharges, means for breaking the foam, and a pipe for returning liquid to the beater.

4. Apparatus for pumping gasiform fluids, which comprises means for foaming the gasiform fluid in a liquid carrier, a pump for compressing the foam, a tank into which the pump discharges, means for breaking the foam, and a pipe for returning liquid to the foam-producing means.

5. Apparatus for pumping gasiform fluids, which comprises means for foaming the gasiform fluid in a liquid carrier, means for compressing the foam, and heating means for breaking the foam and separating the gasiform fluid from the liquid carrier.

6. Apparatus for pumping gasiform fluids and delivering the same at an elevated pressure, which includes means for foaming the gasiform fluid in a liquid carrier, means for compressing and forwarding the foam, means for separating the gasiform fluid therefrom, and means for delivering said fluid at said pressure.

7. The improvement in the art of compressing air, which comprises forming the air into a foam with a carrier-liquid, compressing said foam to the desired pressure, separating the air from the foam, and returning the separated carrier liquid to the foam-forming means for re-use.

8. The improvement in the art of pumping gasiform fluids and delivering the same at an elevated pressure which comprises forming the gasiform fluid into a foam with a carrier-liquid, compressing said foam, forwarding it under compression to the desired point, separating the gasiform fluid, and delivering the same at said pressure.

9. The improvement in the art of pumping gasiform fluids, which comprises forming the gasiform fluid into a foam with a carrier liquid, compressing and forwarding the foam so produced, and expelling the fluid therefrom by heat.

FRANK A. HOWARD.